United States Patent
Koizumi

(10) Patent No.: US 12,027,187 B2
(45) Date of Patent: Jul. 2, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Gaku Koizumi, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/180,422

(22) Filed: Mar. 8, 2023

(65) Prior Publication Data

US 2024/0105219 A1    Mar. 28, 2024

(30) Foreign Application Priority Data

Sep. 22, 2022   (JP) .................................. 2022-151048

(51) Int. Cl.
*G11B 5/35* (2006.01)

(52) U.S. Cl.
CPC ..................................... *G11B 5/35* (2013.01)

(58) Field of Classification Search
None
See application file for complete search history.

(56) References Cited

U.S. PATENT DOCUMENTS

| | | | | |
|---|---|---|---|---|
| 9,007,723 B1 * | 4/2015 | Igarashi | ................. | G11B 5/314 |
| | | | | 360/125.3 |
| 9,330,691 B1 * | 5/2016 | Narita | ................... | G11B 5/3116 |
| 10,657,990 B2 | 5/2020 | Ohtake et al. | | |
| 10,714,126 B2 | 7/2020 | Matsumoto | | |
| 10,789,976 B2 | 9/2020 | Narita et al. | | |
| 2014/0063658 A1 * | 3/2014 | Shimizu | ................... | G11B 5/84 |
| | | | | 216/22 |
| 2014/0118861 A1 | 5/2014 | Funayama | | |
| 2014/0177100 A1 * | 6/2014 | Sugiyama | ............ | G11B 5/1278 |
| | | | | 360/125.03 |
| 2020/0381012 A1 * | 12/2020 | Chembrolu | ............. | G11B 5/115 |

FOREIGN PATENT DOCUMENTS

| | | |
|---|---|---|
| JP | 2012-014792 A | 1/2012 |
| JP | 2014-086122 A | 5/2014 |
| JP | 2019-200827 A | 11/2019 |
| JP | 2020-038743 A | 3/2020 |
| JP | 6771439 B2 | 10/2020 |

\* cited by examiner

*Primary Examiner* — Peter Vincent Agustin

(74) *Attorney, Agent, or Firm* — Kim & Stewart LLP

(57) ABSTRACT

According to one embodiment, a magnetic disk device comprises a magnetic head including a main pole, an auxiliary magnetic pole, side shields disposed on both sides of the main pole in a track width direction with a side gap therebetween, a high frequency oscillation element disposed in the write gap between the main pole and the auxiliary magnetic pole, and a magnetic flux control element disposed in the side gap between the main pole and the side shield to control oscillation frequency of the high frequency oscillation element, an oscillation element controller configured to control bias current supplied to the high frequency oscillation element, and a magnetic flux control element controller configured to control bias current supplied to the magnetic flux control element.

9 Claims, 9 Drawing Sheets

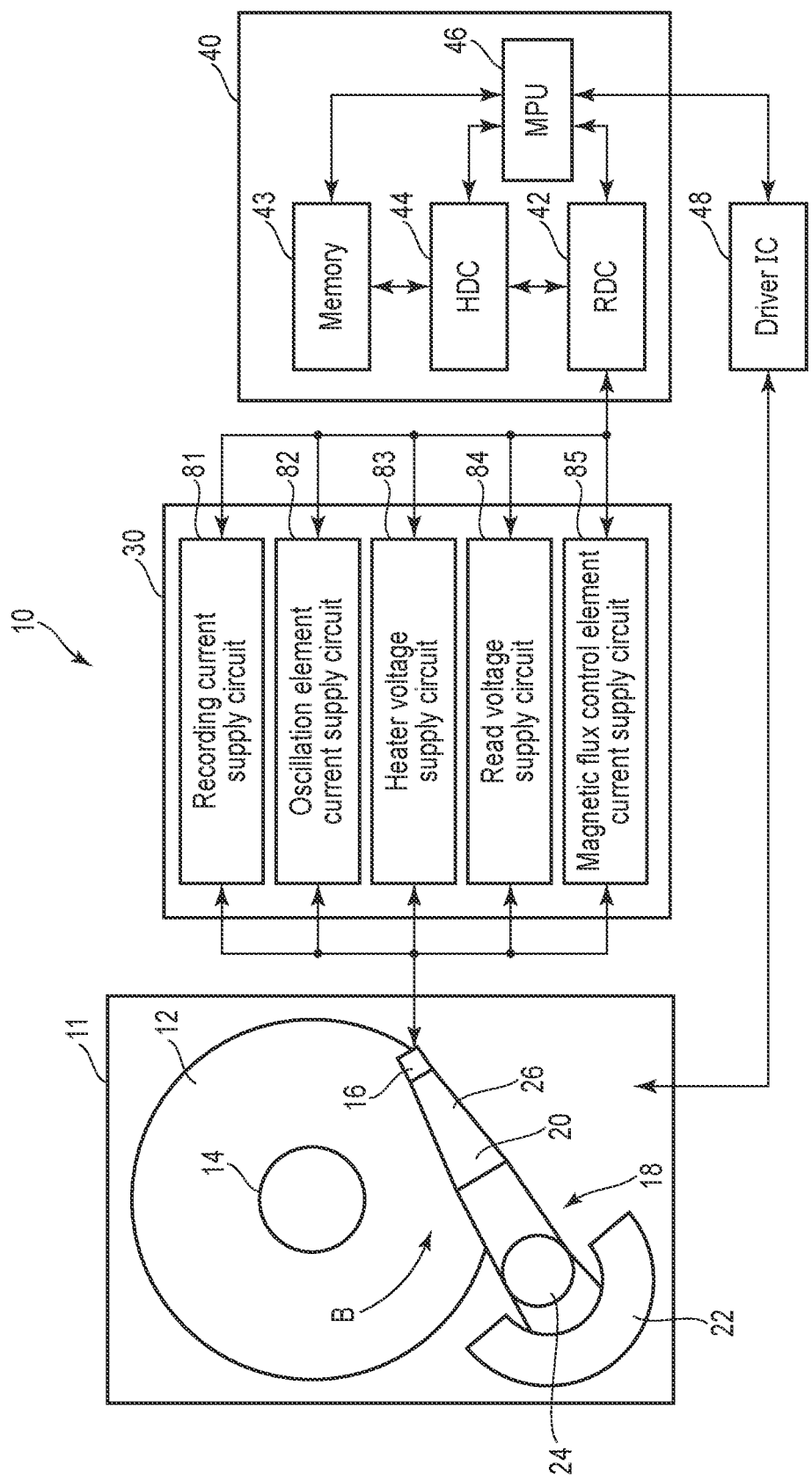
F I G. 1

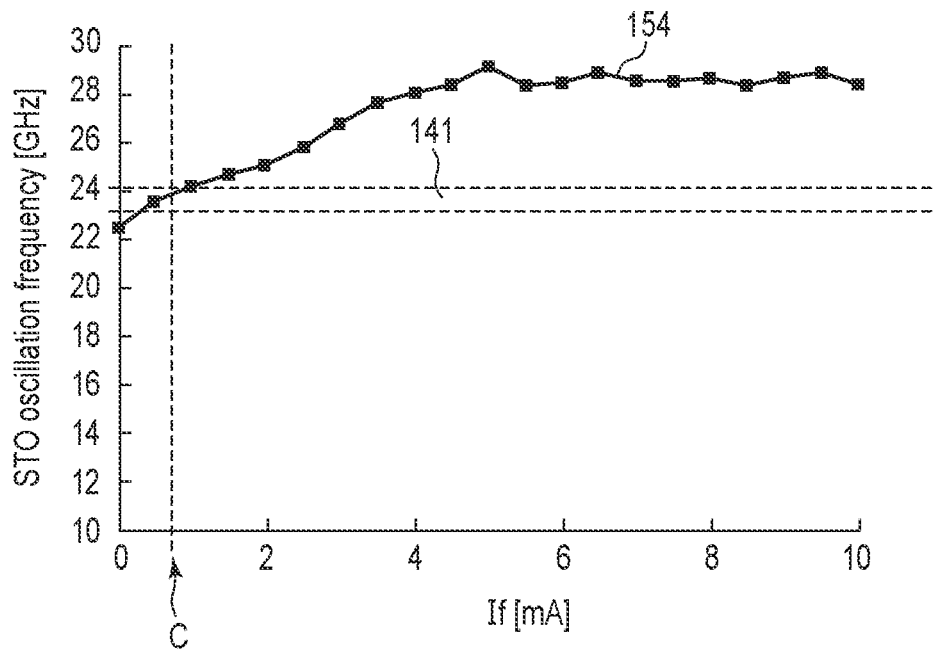
F I G. 14
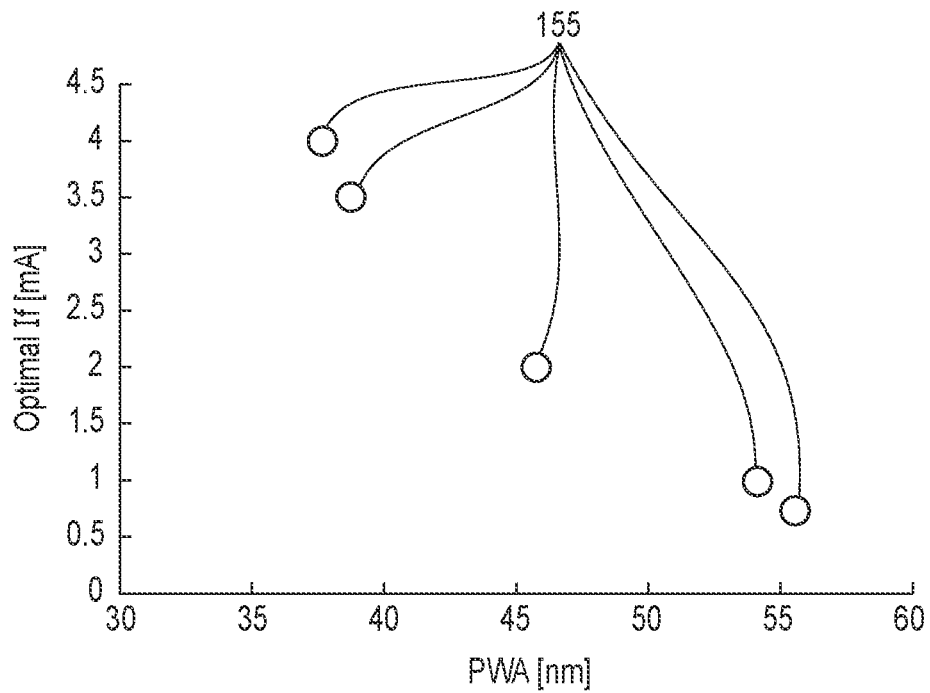
F I G. 15

MAGNETIC DISK DEVICE

CROSS-REFERENCE TO RELATED APPLICATIONS

This application is based upon and claims the benefit of priority from Japanese Patent Application No. 2022-151048, filed Sep. 22, 2022, the entire contents of which are incorporated herein by reference.

FIELD

Embodiments described herein relate generally to a magnetic disk device.

BACKGROUND

In order to improve recording density of hard disk drives (HDDs), magnetic disk devices using assist recording methods have been proposed. Assist recording methods include, for example, a high-frequency assist magnetic recording method which uses high frequency oscillation elements as assist elements.

In magnetic disk devices with multiple magnetic heads, variations in the dimensions of main poles of each magnetic head cause variations in the strength of the magnetic field in a write gap applied to a high frequency oscillation element. This causes the oscillation frequency of the high frequency oscillation element to vary, resulting in an unmatch between the oscillation frequency and the resonance frequency of the medium, which attenuates or eliminates the assist effect.

BRIEF DESCRIPTION OF THE DRAWINGS

FIG. 1 is a schematic block diagram illustrating a magnetic disk device of an embodiment.

FIG. 14 is a graph diagram illustrating a relationship between bias current If and oscillation frequency of STO of another example of the magnetic disk device of Example 2.

FIG. 15 is a graph illustrating a relationship between optimal If and PWA where oscillation frequency is adjusted to 24 GHz.

DETAILED DESCRIPTION

Figure 2:
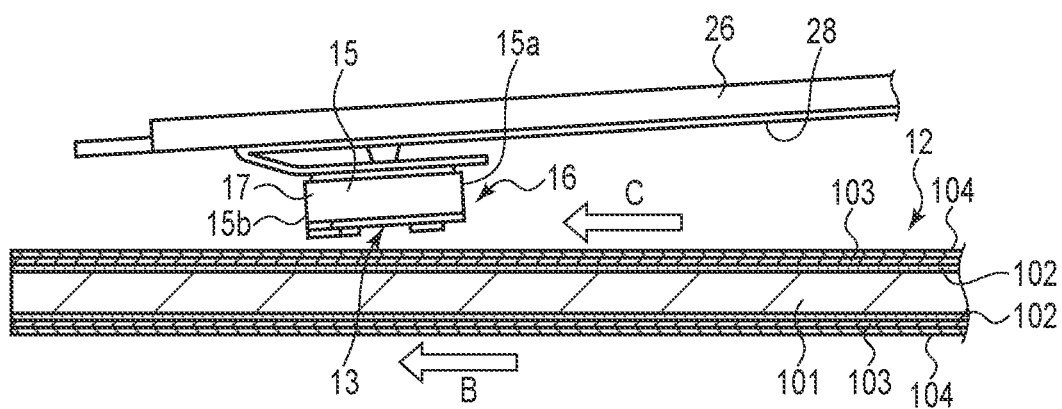
FIG. 2 is a side view illustrating a magnetic head in a flying state and a magnetic disk.

In general, according to one embodiment, a magnetic disk device includes: a magnetic head including a main pole, an auxiliary magnetic pole provided with the main pole with a write gap therebetween, forming a magnetic circuit with the main pole, side shields disposed on both sides of the main pole in a track width direction with a side gap therebetween, a high frequency oscillation element disposed in the write gap, and a magnetic flux control element disposed in the side gap to control oscillation frequency of the high frequency oscillation element; an oscillation element controller configured to control bias current supplied to the high frequency oscillation element; and a magnetic flux control element controller configured to control bias current supplied to the magnetic flux control element.

According to the embodiment, in the magnetic head utilizing a high frequency assist magnetic recording method, the head including the high frequency oscillation element in a write gap between the main pole and the auxiliary magnetic pole, the magnetic flux control element is further disposed between the main pole and the side shield. In the magnetic disk device including the above magnetic head, the oscillation element controller and the magnetic flux control element controller are disposed. With the above magnetic disk device, the magnetic flux control element controller adjusts the magnetization state of the magnetic flux control element, and thereby the magnetic field strength of the external magnetic field in the write gap applied to the high frequency oscillation element can be adjusted, resulting adjustment of oscillation frequency of the high frequency oscillation element. Therefore, even if a discrepancy occurs between the medium resonance frequency and the oscillation frequency of the high frequency oscillation element of each magnetic head due to variations in the dimensions of the head main poles, the magnetic flux control element can be driven to adjust the oscillation frequency independently for each magnetic head to match the medium resonance frequency. According to the embodiment, by adjusting the oscillation frequency of the high frequency element using the magnetic flux control element, variations in the assist effect due to variations in the dimensions of the head main pole can be suppressed.

The magnetic flux control element may include, for example, a first non-magnetic conductive layer, magnetization reversal layer, and second non-magnetic conductive layer stacked in this order from the main pole side.

Ta, Ir, Ru, NiCr, and W may be used as materials for the first non-magnetic conductive layer, for example.

Alloy materials such as NiFe, FeCo, FeCr, and FeV may be used as materials for the magnetization reversal layer, for example.

Cu and Ru may be used as materials for the second non-magnetic conductive layer, for example.

The order of stacking the first non-magnetic conductive layer, magnetization reversal layer, and second non-magnetic conductive layer on the main pole may be reversed.

One magnetic flux control element may be arranged between the main pole and each of side shields disposed at both sides of the main pole. The two magnetic flux control elements may have the same structure.

The high frequency oscillation element may include a third non-magnetic conductive layer, spin injection layer, fourth non-magnetic conductive layer, oscillation layer, and fifth non-magnetic conductive layer stacked in the order stated above from the main pole side.

Ta, Ir, Ru, NiCr, and W may be used as materials for the third non-magnetic conductive layer, for example.

Alloy materials such as NiFe, FeCo, FeCr, and FeV may be used for the spin injection layer, for example.

Cu and Ru may be used as materials for the fourth non-magnetic conductive layer, for example.

Alloy materials such as NiFe, FeCo, FeCr, and FeV may be used for the oscillation layer, for example.

Ta, Ir, Ru, NiCr, and W may be used for the fifth non-magnetic conductive layer, for example.

The order of stacking the third non-magnetic conductive layer, spin injection layer, fourth non-magnetic conductive layer, oscillation layer, and fifth non-magnetic conductive layer on the main pole may be reversed.

A magnetic disk device may include two or more magnetic heads, and may include a first magnetic head having a first width in the track width direction, the first magnetic head including a first main pole to which a first bias current is applied, and a second magnetic head having a second width in the track width direction which is larger than the first width, the second magnetic head including a second main pole to which a second bias current lower than the first bias current is applied. Thus, it is possible to reduce the current carrying capacity of the main pole as the physical width of the air support surface at the trailing end of the main pole is increased, thereby suppressing variations in the assist effect due to head dimension variations.

The oscillation element controller and the magnetic flux control element controller may be provided independently of each other.

Hereinafter, embodiments will be explained with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

Figure 3:
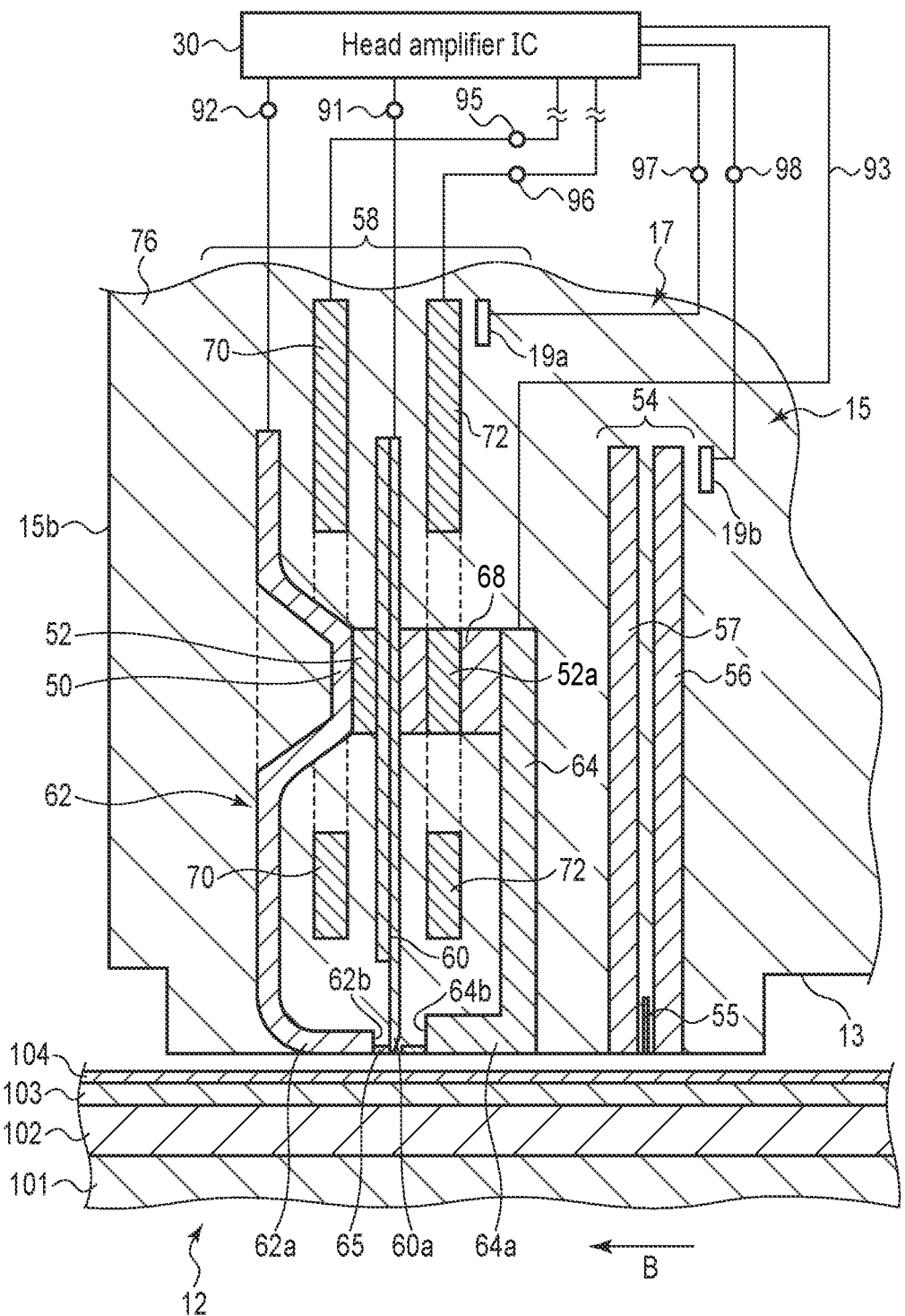
FIG. 3 is a schematic cross-sectional view illustrating a head part of the magnetic head and the magnetic disk, depicted in a partially enlarged manner.

FIG. 1 is a block diagram schematically illustrating a hard disk drive (HDD), which is a magnetic disk device according to an embodiment, FIG. 2 is a side view illustrating a magnetic head and a magnetic disk in a flying state, and FIG. 3 is a schematic cross-sectional view of a head part of the magnetic head and the magnetic disk, depicted in a partially enlarged manner.

As in FIG. 1, HDD 10 includes a rectangular-shaped casing 11, magnetic disk 12 as a recording medium located inside the casing 11, spindle motor 14 which supports and rotates the magnetic disk 12, and multiple magnetic heads 16 which write and read data to and from the magnetic disk 12. Furthermore, the HDD 10 includes a head actuator 18 which moves and positions the magnetic heads 16 on a desired track on the magnetic disk 12. The head actuator 18 includes a suspension assembly 20 which movably supports the magnetic heads 16 and a voice coil motor (VCM) 22 which rotates the suspension assembly 20.

The HDD 10 includes a head amplifier IC 30, main controller 40, and driver IC 48. The head amplifier IC 30 is provided with, for example, the suspension assembly 20 and electrically connected to the magnetic head 16. The main controller 40 and the driver IC 48 are configured, for example, on a control circuit board, which is not shown, located on the rear side of the casing 11. The main controller 40 has an R/W channel (RDC) 42, hard disk controller (HDC) 44, and microprocessor (MPU) 46. The main controller 40 is electrically connected to the head amplifier IC 30 and electrically connected to the VCM 22 and spindle motor 14 via the driver IC 48. The HDD 10 can be connected to a host computer, which is not shown.

As in FIGS. 1 and 2, the magnetic disk 12 is a perpendicular magnetic recording medium with a recording layer which is anisotropic perpendicular to the disk surface. Specifically, the magnetic disk 12 includes a substrate 101, for example, which is formed in the shape of a disk approximately 3.5 inches (8.89 cm) in diameter and formed of a nonmagnetic material. On each surface of the substrate 101, a soft magnetic layer 102 as a base layer, and thereon, a magnetic recording layer 103 and a protective film 104 are sequentially layered. The magnetic disks 12 are coaxially fitted with the hub of the spindle motor 14. The magnetic disk 12 is rotated by the spindle motor 14 in the direction of arrow B at a predetermined speed.

The suspension assembly 20 includes a bearing portion 24 rotatably fixed to the casing 11 and a plurality of suspensions 26 extending from the bearing portion 24. As in FIG. 2, the magnetic head 16 is supported at the extending end of each suspension 26. The magnetic head 16 is electrically connected to the head amplifier IC 30 via a line member 28 in the suspension assembly 20.

Now, the structure of the magnetic head 16 will be described.

As in FIGS. 2 and 3, the magnetic head 16 is configured as a floating head and has a slider 15 formed in an approximately rectangular shape and a head part 17 formed at the outflow (trailing) end of the slider 15. The slider 15 is formed, for example, of sintered alumina and titanium carbide (AlTiC), and the head 17 is formed of multiple layers of thin film.

The slider 15 includes a rectangular air bearing surface (ABS) 13 opposed to the surface of the magnetic disk 12. The slider 15 is maintained in a state of being floated a predetermined amount from the surface of the magnetic disk 12 by airflow C generated between the disk surface and the ABS 13 by the rotation of the magnetic disk 12. The direction of the airflow C coincides with the direction of rotation B of the magnetic disk 12. The slider 15 has a leading end 15a located on the inflow side of the airflow C and a trailing end 15b located on the outflow side of the airflow C.

As in FIG. 3, the head part 17 is a separated magnetic head, including a reproducing head 54 and a record head 58 formed in a thin-film process on the trailing edge 15b of the slider 15. To control the recording and reproducing flying height of head part 17, a record heater 19a is located on the depth side of recording head 58 and a reproducing heater 19b is located on the depth side of reproducing head 54. The reproducing head 54 includes a reproducing element 55 formed of a magnetic layer which exhibits a magneto-resistive effect, and an upper shield 56 and a lower shield 57 with a shield film placed to hold the reproducing element 55 formed of the magnetic layer at the trailing and leading sides of the reproducing element 55. The lower ends of the reproducing element 55, upper shield 56, and lower shield 57 are exposed to the ABS 13 of the slider 15. The reproducing head 54 is connected to the head amplifier IC 30 via electrodes, lines, and line members 28, which are not shown in the figure, and outputs the read data to the head amplifier IC 30.

The recording head 58 is provided on the trailing end 15b side of the slider 15 with respect to the reproducing head 54. The recording head 58 includes a main pole 60 formed of a high permeability material which generates a recording magnetic field perpendicular to the surface of the magnetic disk 12, return magnetic pole 62 which serves as the return magnetic pole (write shield, first shield), and leading core 64 that serves as the leading shield (second shield). The main pole 60 and the return magnetic pole 62 constitute a first magnetic core forming a magnetic path, and the main pole 60 and the leading core 64 constitute a second magnetic core forming a magnetic path. The recording head 58 includes a first coil (recording coil) 70 wound around the first magnetic core and a second coil (recording coil) 72 wound around the second magnetic core.

As in FIG. 3, the main pole 60 extends approximately perpendicular to the surface of the magnetic disk 12. The tip 60a of the main pole 60 in the magnetic disk 12 side is tapered toward the disk surface, and its cross-section is, for example, trapezoidal. The tip surface of the main pole 60 is exposed to the ABS 13 of the slider 15. The width of the trailing end surface 60b of the tip 60a substantially corresponds to the width of the track in the magnetic disk 12.

The return magnetic pole 62 formed of a soft magnetic material is located in the trailing side of the main pole 60 to efficiently close a magnetic path through the soft magnetic layer 102 of the magnetic disk 12 directly below the main pole 60. The return magnetic pole 62 includes a first joint 50 that is formed in an approximately L-shape and connected to the main pole 60. The first joint 50 is connected to the upper part of the main pole 60, i.e., the part of the main pole 60 apart from the ABS 13, via a non-conductor 52.

The tip 62a of the return magnetic pole 62 is formed in an elongated rectangular shape, and its tip end surface is exposed to the ABS 13 of the slider 15. The leading side end surface 62b of the tip 62a extends along the track width direction of the magnetic disk 12 and also extends approximately perpendicular to the ABS 13. This leading side end surface 62b faces the trailing side end surface 60b of the main pole 60 approximately parallel with the trailing side end surface 60b of the main pole 60 with a write gap WG therebetween.

The first coil 70 is arranged to wind around a magnetic circuit (first magnetic core) which includes the main pole 60 and the return magnetic pole 62. The first coil 70 is wound around the first joint 50, for example. When writing a signal to the magnetic disk 12, by applying recording current to the first coil 70, the first coil 70 excites the main pole 60 and causes a magnetic flux to flow to the main pole 60.

The spin torque control element (STO) 65 is located between the tip 60a of the main pole 60 and the return pole 62 in the write gap WG, and is partially exposed to ABS 13. The lower end surface of STO 65 is not limited to being located flush with the ABS 13, and it may be spaced apart from the ABS 13 in the upward direction in the height direction. The STO is an example of an assist element and may be configured for the purpose of an assist effect associated with magnetic flux control by reversing the magnetization in the opposite direction of the magnetic flux direction in the write gap by spin torque, or for the purpose of a high frequency assist effect by causing resonance of the medium magnetization by oscillating the magnetization at a high frequency by spin torque (high-frequency assist element), for example.

As in FIG. 3, connection terminals 91 and 92 are connected to main pole 60 and the return magnetic pole 62, respectively, and the connection terminals 91 and 92 are connected to the head amplifier IC 30 via lines. As a result, a current circuit is configured such that current can be energized from the head amplifier IC 30 through the main pole 60, STO 65, and return magnetic pole 62 in series. In addition, connection terminals 97 and 98 are connected to the recording heater 19a and the reproducing heater 19b, respectively, and the connection terminals 97 and 98 are connected to the head amplifier IC 30 via lines.

As in FIG. 3, a leading core 64 formed of a soft magnetic material is disposed in the leading side of the main pole 60 to be opposed to the main pole 60. The leading core 64 is formed in an approximately L-shape, and the tip 64a on the magnetic disk 12 side is formed in an elongated rectangular shape. The tip end surface (lower end surface) of the tip 64a is exposed to the ABS 13 of the slider 15. The trailing side end surface 64b of the tip 64a extends along the track width direction of the magnetic disk 12. The trailing side end surface 64b is opposed to the leading side end surface of the main pole 60 with a gap therebetween. The gap is covered by a protective insulating film 76 as a non-magnetic material.

The leading core 64 includes a second joint 68 bonded to the back gap with the main pole 60 at a position apart from the magnetic disk 12. The second joint 68 is formed of, for example, a soft magnetic material and forms a magnetic circuit together with the main pole 60 and the leading core 64. The second coil 72 of the recording head 58 is arranged to wrap around the magnetic circuit (second magnetic core) including the main pole 60 and the leading core 64 and applies a magnetic field to the magnetic circuit. The second coil 72 is wound around, for example, the second joint 68. A non-conductive 52a can be inserted as part of the second joint 68. The second joint 68 is connected through the non-conductor 52a to the top of the main pole 60, i.e., the portion of the main pole 60 away from the ABS 13. Alternatively, a nonmagnetic material may be inserted in place of the non-conductor 52a.

The second coil 72 is wound in the opposite direction to the first coil 70. The first coil 70 and the second coil 72 are connected to terminals 95 and 96, respectively, which are connected to the head amplifier IC 30 via lines. The second coil 72 may be connected in series with the first coil 70. The first coil 70 and the second coil 72 may be separately controlled to supply current. The current supplied to the first coil 70 and the second coil 72 is controlled by the head amplifier IC 30 and the main controller 40.

Figure 4:
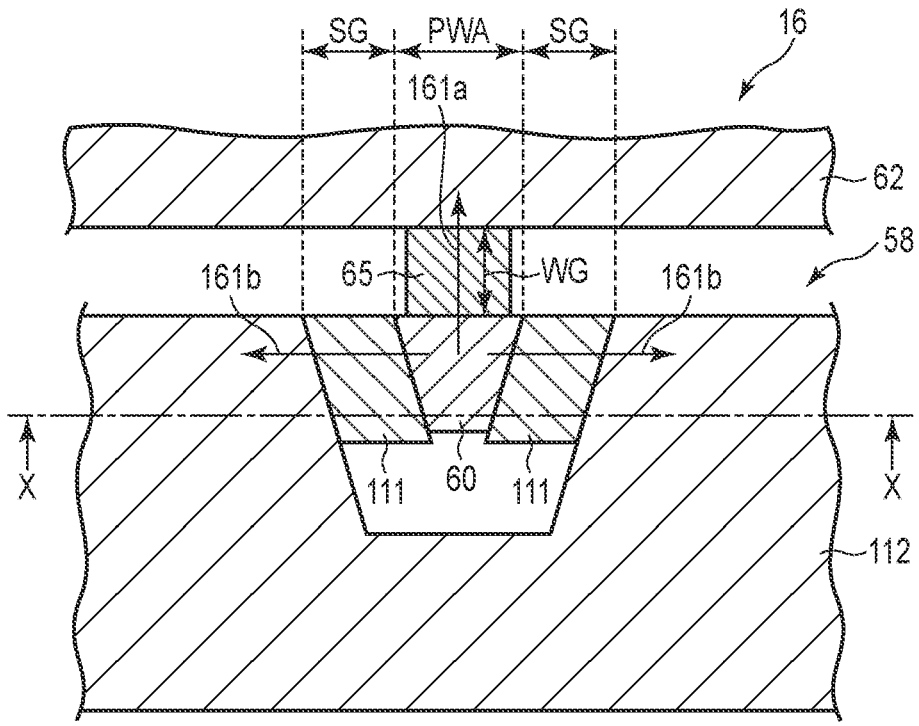
FIG. 4 illustrates the magnetic head and a recording head of the embodiment, viewed from an air bearing surface side.

FIG. 4 is a view of the recording head in the magnetic head of the embodiment viewed from the air bearing surface side.

As in the figure, the recording head 58 includes a main pole 60, and an auxiliary magnetic pole 62 which is located apart from the main pole 60 with a write gap WG therebetween and forms a magnetic circuit together with the main pole 60. A spin torque oscillator (STO) as a high frequency oscillation element 65 is disposed between the end surface 60-1 of the main pole 60 in the write gap WG side and the auxiliary magnetic pole 62. Side shields 112 are located on both sides 60-2 and 60-3 of the main pole 60 in the track width direction with a side gap SG therebetween. At least one magnetic flux control element (flux control layer: FCL)

111 may be provided with the main pole 60 in the side gap SG side, and in this example, a pair of FCLs 111 for controlling the oscillation frequency of the high frequency oscillation element 65 are provided on both sides 60-2 and 60-3 of the magnetic pole 60.

Figure 5:
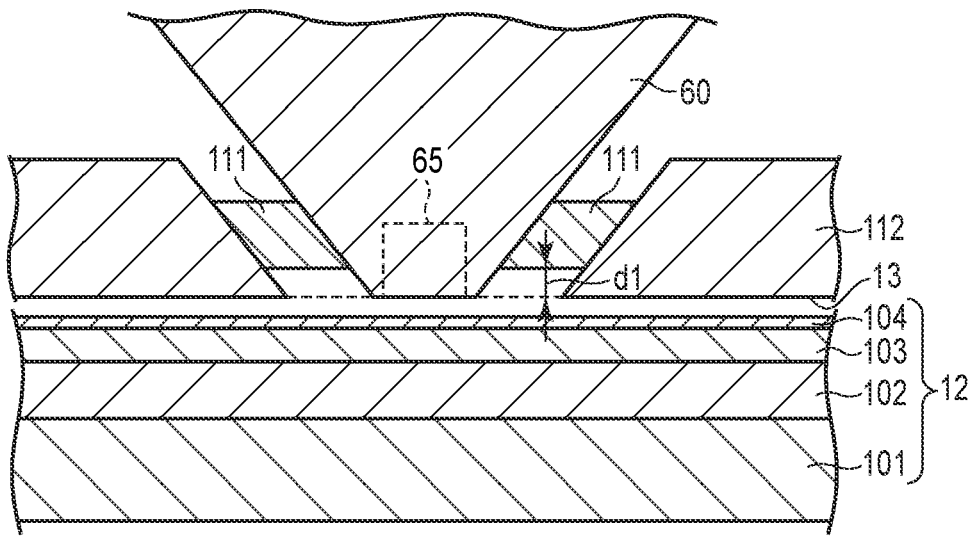
FIG. 5 illustrates an arrangement of the magnetic head of FIG. 4 and a magnetic recording medium.

FIG. 5 is a diagram illustrating an arrangement of the magnetic head of FIG. 4 and a magnetic recording medium.

The magnetic head 16 of FIG. 5 is an X-X' cross section of the magnetic head 16 of FIG. 4. The magnetic recording medium 12 is positioned opposed to the ABS 13 of the magnetic head 16.

The FCL 111 may be located backward from the STO 65 viewed from the ABS 13. This can reduce fringing fields which would interfere with adjacent tracks.

The head amplifier IC 30 which drives the magnetic head 16 and the recording head 58 includes, as in FIG. 1, a recording current supply circuit 81 which supplies recording current to the first coil 70 and the second coil 72 via connection terminals 95 and 96, oscillation element current supply circuit 82 which supplies bias current to the STO 65 via lines which are not shown and connection terminals 91 and 92, heater voltage supply circuit 83 which supplies heater voltage to the recording heater 19a and the reproducing heater 19b via lines which are not shown and connection terminals 97 and 98, read voltage supply circuit 84 which reads reproducing signals recorded on the magnetic disk 12 while applying voltage to the reproducing element part of the magnetic head, and magnetic flux control element current supply circuit 85 as the magnetic flux control element controller, which supplies bias current to the FCL 111 via the lines 91 an d93 and the side shield 112 of the leading core 64. In addition, although they are not shown, there are a timing arithmetic unit which controls the time and timing of current flow to the recording current supply circuit 81 and also controls the time and timing of current flow to the oscillation element current supply circuit 82, and a recording current waveform generator which generates the recording current waveform corresponding to the recording pattern signals generated in the R/W channel 42.

As in FIGS. 1 to 5, the magnetic disk device 10 of the embodiment uses the microwave-assisted magnetic recording method, and includes the oscillation element current supply circuit 82 to drive the STO 65 and the magnetic flux control element current supply circuit 85 to drive the FCL 111. The return magnetic pole 62 and the side shield 112 can be separated, by which the magnetic flux control element current supply circuit 8 to return from the main pole 60 through the FCL 111 to the side shield, as shown by arrow 161b can be secured. The FCL 111 can be energized with a bias current If in the direction indicated by arrow 161b. Furthermore, the bias current Is can be energized in the STO 65 by the oscillating element current supply circuit 82, which energizes the current in the direction of electron flow from the main pole to the return magnetic pole 62 side, as shown by arrow 161a. The oscillator element current supply circuit 82 can be secured by providing a first joint 50 where the main pole 60 and the return magnetic pole 62 are joined through an insulating layer 52 at a position separated from the ABS 13 of the magnetic head 16.

According to the embodiment, the oscillation element current supply circuit 82 supplying to the STO and the magnetic flux control element current supply circuit 85 supplying to the FCL can be separated and provided independently of each other, and thus each element of the STO 65 and FCL 111 can be controlled independently. By controlling the bias current If supplied to the FCL 111 and the bias current Is supplied to the STO 65, it is possible to adjust the magnetic field strength in the write gap applied to the STO 65 according to the magnetization state of the FCL 111.

In order to resonate and assist the magnetization reversal of the magnetic recording layer 103 by the high-frequency magnetic field from the STO 65, the frequency of the high-frequency magnetic field, that is, the oscillation frequency of the magnetization of STO 65 and the resonance frequency of the magnetic recording layer 103 can be matched. Since both are magnetization oscillations based on ferromagnetic resonance, the oscillation frequency of STO 65 depends on the effective magnetic field applied to the STO 65, i.e., the magnetic field strength in the write gap WG, and the resonance frequency of the magnetic recording layer 103 depends on the anisotropic magnetic field (Hk) of the magnetic recording layer 103. For the assist recording of magnetic recording layer 103, the STO 65 can be oscillated at the optimal frequency for the medium. The oscillation frequency of STO 65 varies with the magnetic field strength within the write gap WG, and the magnetic field strength within the gap varies with the width PWA of the main pole 60, and thus, dimensional variations of the head may make it difficult to resonate the medium magnetization reversal. Therefore, it is effective to control the magnetic field in the gap independently. According to the embodiment, even if a discrepancy occurs between the medium resonance frequency and the oscillation frequency of STO 65 of each magnetic head 16, the oscillation frequency can be adjusted independently for each magnetic head by driving the FCL 111 to match the medium resonance frequency, and therefore, it is possible to suppress the variation of the assist effect for each magnetic head and the attenuation of the assist effect due to this variation.

Figure 6:
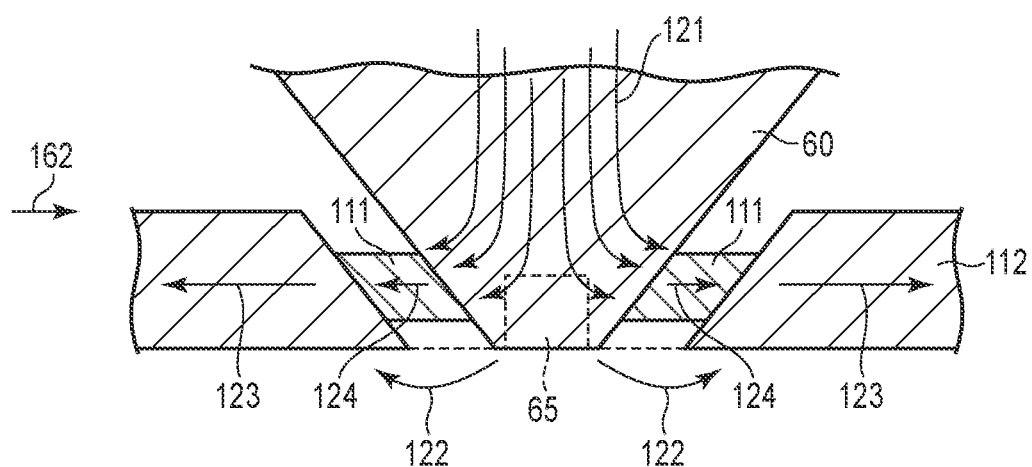
FIG. 6 illustrates magnetic flux flow of the magnetic head where drive current is not applied to FCL.

FIG. 6 illustrates magnetic flux flow of the magnetic head where drive current is not applied to the FCL.

Figure 7:
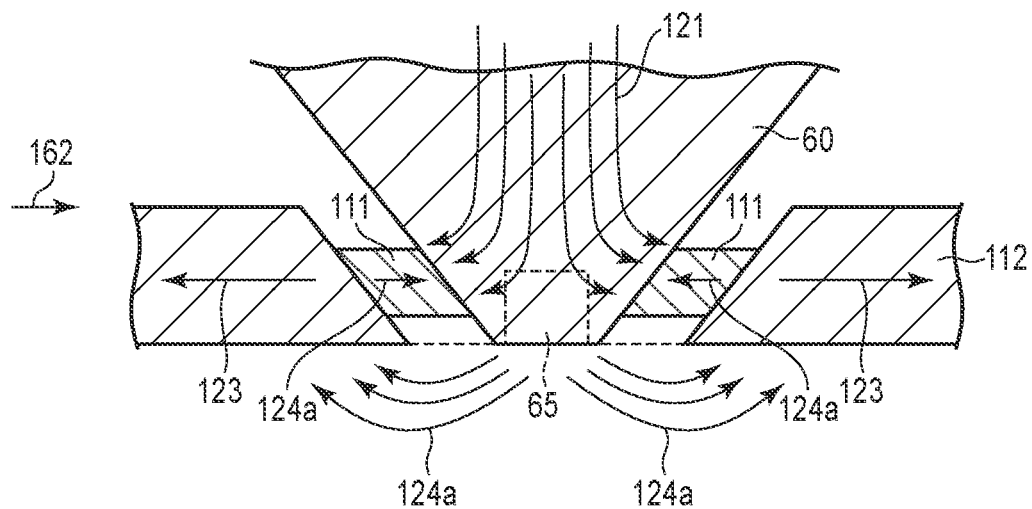
FIG. 7 illustrates magnetic flux flow of the magnetic head where drive current is applied to FCL.

FIG. 7 illustrates magnetic flux flow of the magnetic head where drive current is applied to the FCL.

Figure 8:
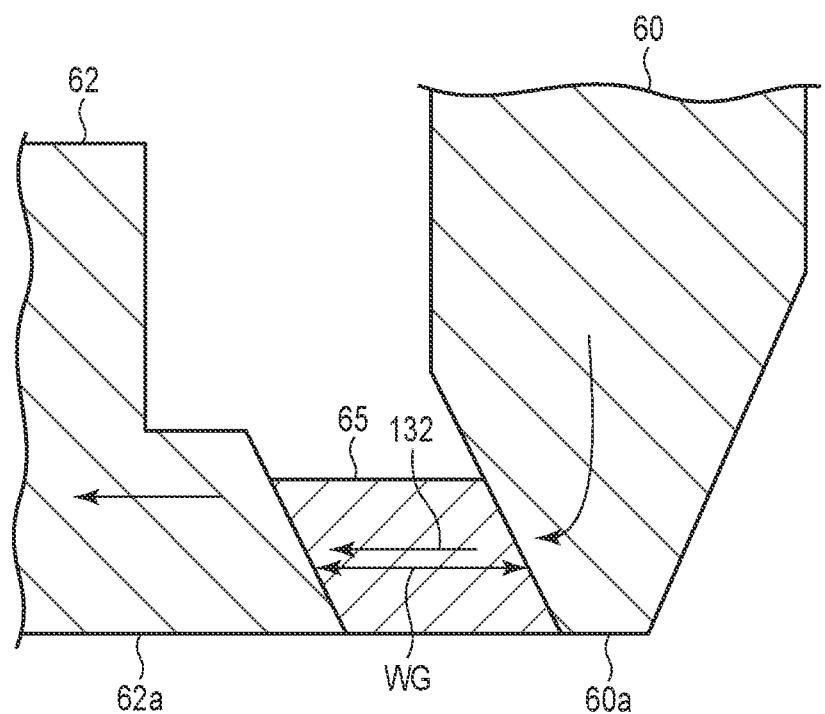
FIG. 8 illustrates the magnetic flux flow of the magnetic head of FIG. 6 viewed in a cross-sectional view, taken along a track center therein.

FIG. 8 illustrates the magnetic flux flow of the magnetic head of FIG. 6 viewed in a cross-sectional view, taken along a track center therein from the direction of arrow 162.

Figure 9:
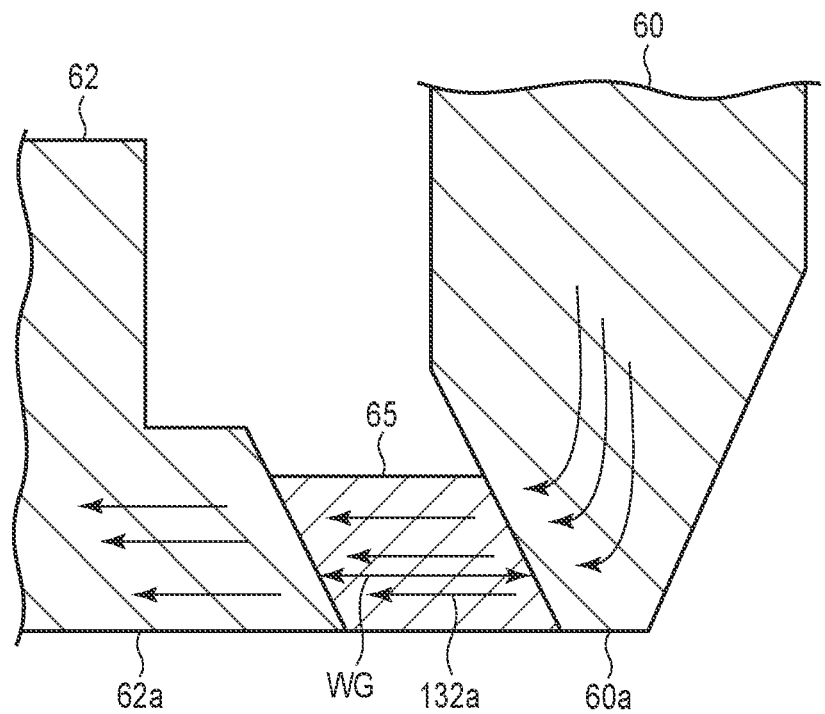
FIG. 9 illustrates the magnetic flux flow of the magnetic head of FIG. 7 viewed in a cross-sectional view, taken along a track center therein.

FIG. 9 illustrates the magnetic flux flow of the magnetic head of FIG. 7 viewed in a cross-sectional view, taken along a track center therein from the direction of arrow 162.

As in FIG. 6, when the drive current is not energized in the FCL 111, the direction of magnetization of FCL 111 as represented by arrow 124 is aligned with the direction of magnetization of the main pole 60 as represented by arrow 121, and the direction of magnetization in the side shield 112 as represented by arrow 123. The magnetic field from the main pole 60 is closed within the main pole 60 and the side shield 112 as shown by arrow 122 such that the magnetic field intensity induced in the write gap WG is small as shown by arrow 132 of FIG. 8. On the other hand, as in FIG. 7, by driving current in the FCL 111 and reversing the direction of magnetization of FCL 111 to the direction opposite to that in the main pole 60 and the side shield 112 as shown by arrow 124a, the magnetic permeability in the side gap SG becomes effectively negative, and the magnetic field closed in the side gap SG is induced into the write gap WG as shown by arrow 122a, and the magnetic field intensity in the write gap WG increases as shown by arrow 132a. As above, the control of the magnetization of FCL 111 makes it possible to independently control the oscillation frequency of the STO 65 which depends on the magnetic field strength within the write gap WG.

Hereinafter, Examples will be cited in order to explain the magnetic disk device of the embodiment.

Example 1

Figure 10:
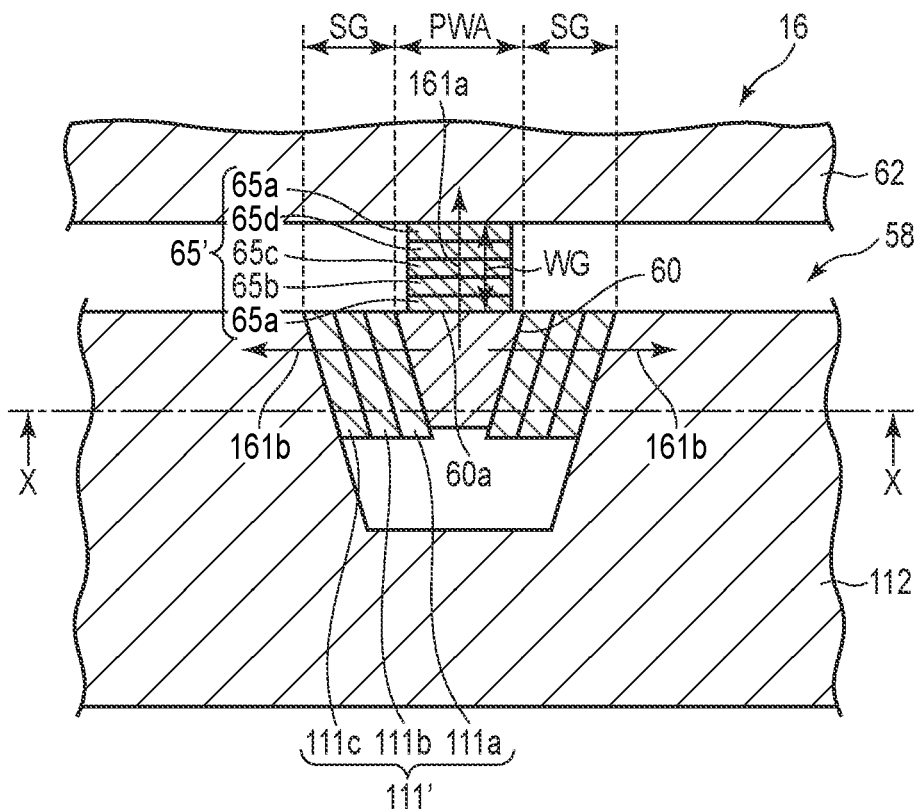
FIG. 10 is a schematic view illustrating a cross-sectional structure of the magnetic head used in the magnetic disk device of Example 1.

FIG. 10 is a schematic diagram illustrating the cross-sectional structure of the magnetic head used in the magnetic disk device of Example 1.

The magnetic disk device of Example 1 includes a magnetic head with the structure of FIG. 10.

The magnetic head 16' of Example 1 has the same structure as in FIG. 4, except that STO65' is provided instead of STO 65 and FCL 111' is provided instead of FCL 111.

The STO 65' includes a third non-magnetic conductive layer 65a, spin injection layer 65b, fourth non-magnetic conductive layer 65c, an oscillation layer 65d disposed sequentially on the trailing end 60-1 of the main pole 60. Here, the third non-magnetic conductive layer 65a may be omitted if necessary. Furthermore, on the tip 60a of the main pole 60, the third non-magnetic conductive layer 65a, spin injection layer 65b, fourth non-magnetic conductive layer 65c, oscillation layer 65d, and fifth non-magnetic conductive layer 65e may be formed in the reverse order, such that the bias current is energized to the polarity flowing to the tip 62a of the return magnetic pole 62 through the fifth non-magnetic conductive layer 65e, oscillation layer 65d, fourth no-magnetic conductive layer 65c, spin injection layer 65b, and third non-magnetic conductive layer 65a.

The FCL 111' includes a first non-magnetic conductive layer 111a, magnetization reversal layer 111b, and second non-magnetic conductive layer 111c on the side shield side end surfaces 60-2 and 60-3 of the main pole 60. Here, the first non-magnetic conductive layer 111a may be omitted if necessary. Furthermore, on the side shield side end surfaces 60-2 and 60-3 of the main pole 60, the first non-magnetic conductive layer 111a, magnetization reversal layer 111b, and second non-magnetic conductive layer 111c may be formed in the reverse order, such that, on the side shield side end surfaces 60-2 and 60-3, the bias current is energized to the polarity flowing to the side shield 112 through the second non-magnetic conductive layer 111c, magnetization reversal layer 111b, and first non-magnetic conductive layer 111a.

Here, as two FCLs 111' provided with the side gap SW, from the main pole 60 side, first non-magnetic conductive layer 111a: Ta 20 nm, magnetization reversal layer 111b: NiFe 5 nm, second non-magnetic conductive layer 111c: Cu 2 nm were formed in this order.

Furthermore, as STO 65', from the main pole 60 side, third non-magnetic conductive layer 65a: Ta 6 nm, spin injection layer 65b: NiFe 3 nm, fourth non-magnetic conductive layer 65c: Cu 2 nm, oscillation layer 65d: FeCo 8 nm, fifth non-magnetic conductive layer 65e: Ta 6 nm were formed in this order.

A head with a recording width PWA of 45 nm in the ABS 13 was prepared as the main pole 60.

Here, for the magnetization reversal layer and the oscillation layer, the magnetization volume, which is represented by the product of saturation magnetization and film thickness, can be obtained. The magnetization volume of the magnetization reversal layer is about 5 nmT because the saturation magnetization of NiFe is about 1 T. The magnetization volume of the oscillation layer is about 19.2 nmT because the saturation magnetization of FeCo is about 2.4 T. In order to generate a high-frequency magnetic field with sufficient intensity for resonance with the media, it is desired that the oscillation magnetization volume is large. On the other hand, since the magnetization reversal layer can be used to adjust the magnetic field intensity applied to the oscillation layer within the write gap, the magnetization volume of the magnetization reversal layer need not be as large as the magnetization volume of the oscillation layer. Rather, the magnetization volume of the magnetization reversal layer can be made smaller than the magnetization volume of the oscillation layer in order to stably reverse the magnetization of the magnetization reversal layer. By energizing the FCL 111 with bias current If in the direction of electron flow from the main pole 60 side to the side shield 112 side, as shown by arrow 116b, the spin torque of reflection through the second non-magnetic conductive layer 111c causes the magnetization reversal layer 111b to reverse. Furthermore, by energizing STO65' with bias current Is in the direction of electron flow from the main pole 60 to the return magnetic pole 62, as shown by arrow 161a, the spin torque between the spin injection layer 65b and the oscillation layer 65d causes the magnetization of the oscillation layer 65d to oscillate in-plane. In this structure, the oscillation frequency was observed by energizing the bias current Is to the STO 65 while changing the bias current If energized to the FCL 111. The results obtained are shown in FIG. 11.

Figure 11:
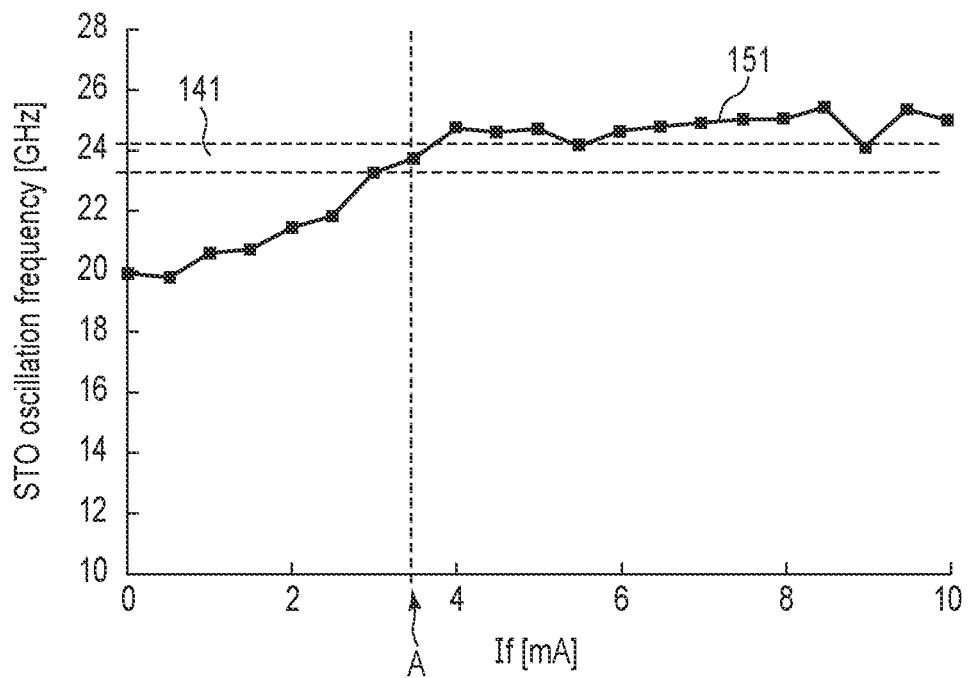
FIG. 11 is a graph diagram illustrating a relationship between bias current If and oscillation frequency of STO of Example 1.

FIG. 11 is a graph illustrating the relationship between the bias current If and the oscillation frequency of the STO of the magnetic disk device of Example 1.

Curve 151 represents the change in oscillation frequency of STO 65 with respect to the bias current If energizing the FCL 111.

As shown in the figure, as the bias current If is increased, the magnetization of FCL 111 reverses, and the magnetic field in the write gap applied to the STO 65 increases, and thus, the oscillation frequency of STO 65 increases accordingly.

For example, if the resonance frequency of the magnetic recording layer 103 of the magnetic recording medium 12 is 24 GHz, it is difficult to make the magnetic recording layer 103 resonate because the oscillation frequency is as low as 20 GHz maximum when the FCL 111 is not driven. However, by adjusting If to A in FIG. 8, the oscillation frequency can be adjusted to an optimal range 141 (24 GHz maximum) including the medium recording layer resonance frequency, and the magnetization of the magnetic recording layer 103 can resonate, resulting efficiently assist in the magnetization reversal of the medium.

Thus, in the magnetic disk device 10 of the embodiment, with the high frequency assist magnetic recording method in which bias current is energized to the STO 65 provided with the write gap WG between the main pole 60 and the auxiliary magnetic pole 62 to oscillate the STO 65 for assisted recording, the FCL 111 is further installed between the main pole 60 and the side shield 112, and by adjusting the magnetization state of the FCL 111, the magnetic field strength of the external magnetic field applied to the STO 65 can be adjusted, and thereby the oscillation frequency of the STO 65 can be adjusted.

Example 2

The magnetic disk device of Example 2 includes a magnetic head with a structure similar to that of FIG. 10, except that the width PWA of the head main pole 60 is different from that of Example 1.

A set of five magnetic heads were prepared for a magnetic disk device by changing the width PWA of the air bearing surface of the main pole 60 in the range of approximately 38 to 55 nm. Five sets of the five magnetic heads were incorporated to manufacture five magnetic disk devices, respectively. By energizing current to the direction of electron flow direction from the main pole 60 to the side shield 112, the spin torque of the reflection through the second non-magnetic conductive layer 111c causes the magnetization reversal layer 111b to be reversed. Furthermore, by energizing the STO 65' with current in the direction of electron flow from the main pole 60 to the return magnetic pole 62 side, the spin torque between the spin injection layer 65b and the oscillation layer 65d will cause the magnetization of oscillation layer 65d to oscillate in-plane.

Figure 12:
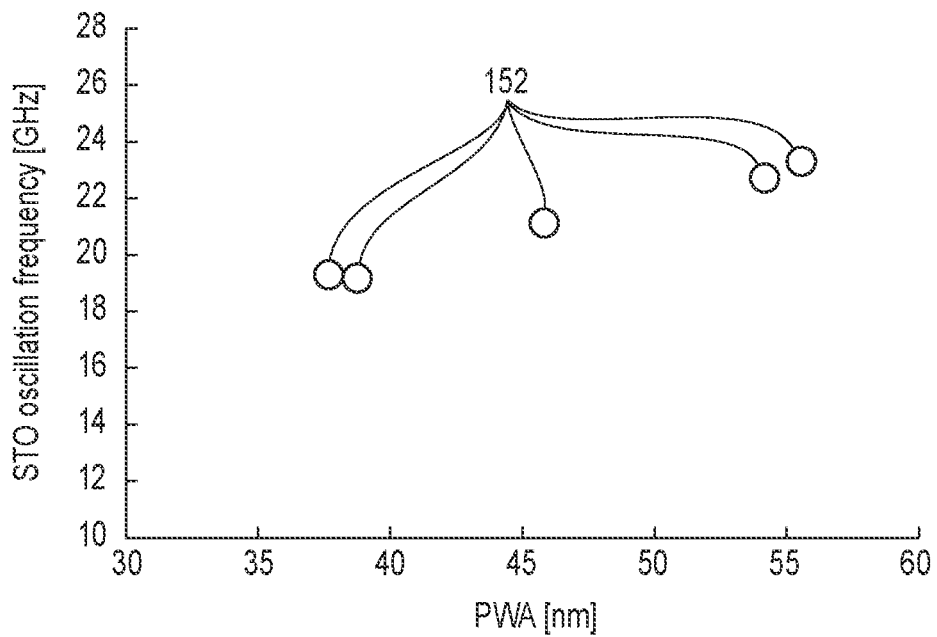
FIG. 12 is a graph diagram illustrating a relationship between width PWA of a head main pole and STO oscillation frequency where If is not applied.

FIG. 12 is a graph illustrating the relationship between width PWA of the head main pole and STO oscillation frequency for the case where If is not energized.

152 indicates results obtained in this structure from the observed oscillation frequency when the STO is driven when If is not energized. As in FIG. 12, it can be confirmed that the width PWA of the main pole 60 becomes wider, the magnetic field strength from the main pole 60 becomes greater, i.e., the magnetic field strength in the write gap WG applied to the STO 65 becomes greater, resulting greater oscillation frequency of the STO 65. Therefore, since the deviation between the resonance frequency of the magnetic recording layer 103 and the oscillation frequency of the STO 65 also changes depending on the PWA, the degree of magnetization reversal of FCL 111, i.e., the adjustment of If energizing the FCL 111, can also be varied by the PWA.

Figure 13:
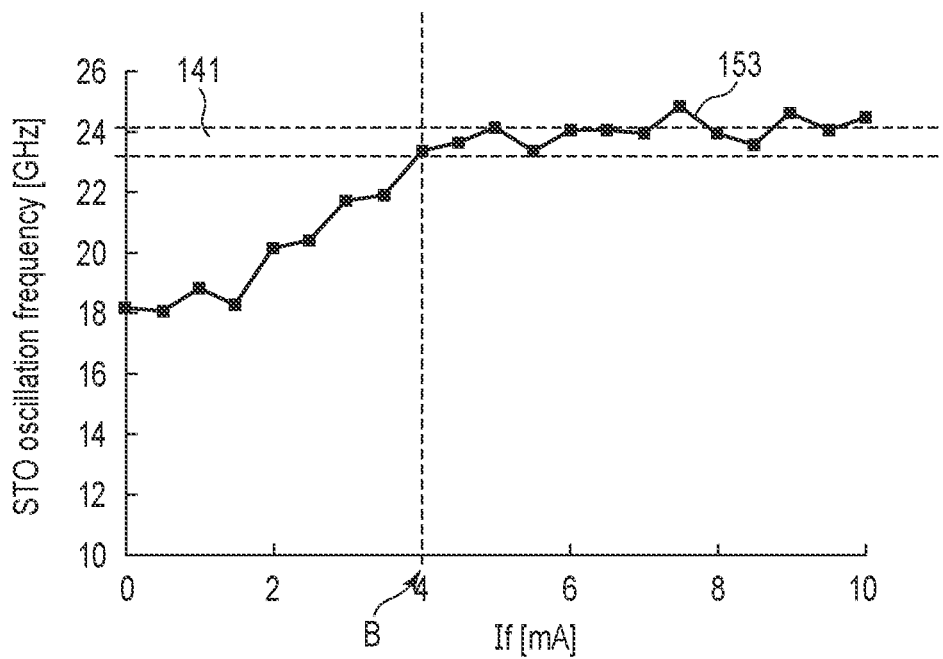
FIG. 13 is a graph diagram illustrating a relationship between bias current If and oscillation frequency of STO of an example of the magnetic disk device of Example 2.

FIG. 13 is a graph illustrating the relationship between the bias current If and the oscillation frequency of the STO in an example of the magnetic disk device of Example 2.

FIG. 14 is a graph illustrating the relationship between the bias current If and the oscillation frequency of the STO in another example of the magnetic disk device of Example 2.

Curve 153 of FIG. 13 indicates results of observing the STO oscillation frequency of a magnetic disk device with a 38 nm PWA magnetic head while changing the bias current If, and curve 154 of FIG. 14 indicates results of same observing with a 55 nm PWA magnetic head while changing the bias current If.

As in FIG. 13, in the case of 38 nm PWA, the magnetic field strength in the write gap is small and the oscillation frequency is low when If is zero. Thus, it is considered that If must be energized to a value B (approximately 4 mA) in order to fit the oscillation frequency to an optimal range 141 (24 GHz maximum) including the medium recording layer resonance frequency. On the other hand, as in FIG. 14, in the case of 55 nm PWA, the magnetic field strength in the write gap is large and the original oscillation frequency is high. Thus, it is possible to optimize the frequency by energizing If to a value C (about 0.7 to 0.8 mA). Therefore, the optimal If for optimizing the STO oscillation frequency will vary depending on the PWA.

FIG. 15 is a graph illustrating the relationship between optimal If and PWA when the oscillation frequency is adjusted to 24 GHz.

155 indicates optimal If for PWA. As in FIG. 15, If can be adjusted lower for larger PWA in order to make the recording layer medium resonate regardless of head dimension variation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic head including
      a main pole,
      an auxiliary magnetic pole provided with the main pole with a write gap therebetween, forming a magnetic circuit with the main pole,
      side shields disposed on both sides of the main pole in a track width direction with a side gap therebetween,
      a high frequency oscillation element disposed in the write gap between the main pole and the auxiliary magnetic pole, and
      a magnetic flux control element disposed in the side gap between the main pole and the side shield to control oscillation frequency of the high frequency oscillation element;
   an oscillation element controller configured to control bias current supplied to the high frequency oscillation element; and
   a magnetic flux control element controller configured to control bias current supplied to the magnetic flux control element.

2. The magnetic disk device of claim 1, wherein a joint is disposed in a position apart from an air bearing surface of the magnetic head, the joint in which the main pole and the auxiliary magnetic pole are joined via an insulating layer.

3. The magnetic disk of claim 1, wherein the auxiliary magnetic pole and the side shield are separated.

4. The magnetic disk device of claim 1, wherein the magnetic flux control element includes a first non-magnetic conductive layer disposed on the main pole, a magnetization reversal layer disposed in the first non-magnetic conductive layer, and a second non-magnetic conductive layer disposed in the magnetization reversal layer.

5. The magnetic disk device of claim 1, wherein the high frequency oscillation element includes a third non-magnetic conductive layer disposed on the main pole, a spin injection layer disposed on the third non-magnetic conductive layer, a fourth non-magnetic conductive layer disposed on the spin injection layer, an oscillation layer disposed on the fourth non-magnetic conductive layer, and a fifth non-magnetic conductive layer disposed on the oscillation layer.

6. The magnetic disk device of claim 1, wherein a magnetization volume of a magnetization reversal layer of the magnetic flux control element is smaller than a magnetization volume of an oscillation layer of the high frequency oscillation element.

7. The magnetic disk device of claim 1, comprising two or more magnetic heads each identical to the magnetic head, wherein
   the device comprises:
      a first magnetic head having a first width in a track width direction, the first magnetic head including a first main pole to which first bias current is applied; and
      a second magnetic head having a second width which is greater than the first width in a track width direction, the second magnetic head including a second main pole to which second bias current which is lower than the first bias current is applied.

8. The magnetic disk device of claim 1, wherein the magnetic flux control element recedes from the high frequency oscillation element when viewed from an air bearing surface.

9. The magnetic disk device of claim 1, wherein the oscillation element controller and the magnetic flux control element controller are disposed independently.

* * * * *